United States Patent [19]
Cheris et al.

[11] Patent Number: 5,715,938
[45] Date of Patent: Feb. 10, 1998

[54] COMPACT DISC STORAGE CASE

[75] Inventors: Albert B. Cheris, Highland Park, Ill.;
Robert B. Staubitz, Collinsville;
Timothy Repp, New Hartford, both of Conn.

[73] Assignee: Tenex Corporation, Elk Grove Village, Ill.

[21] Appl. No.: 789,790

[22] Filed: Jan. 29, 1997

[51] Int. Cl.[6] .................................................. B65D 85/57
[52] U.S. Cl. ........................ 206/308.1; 206/309; 220/331
[58] Field of Search .............................. 206/307, 308.1, 206/309, 310; 220/329, 331

[56] References Cited

U.S. PATENT DOCUMENTS

| | | |
|---|---|---|
| 4,225,038 | 9/1980 | Egly. |
| 4,260,069 | 4/1981 | Juergens. |
| 4,664,261 | 5/1987 | Frodelius. |
| 4,693,364 | 9/1987 | Wakelin. |
| 4,775,075 | 10/1988 | Kamin et al.. |
| 4,801,004 | 1/1989 | Egly et al.. |
| 5,038,932 | 8/1991 | Sheu. |
| 5,263,580 | 11/1993 | Ciba et al.. |
| 5,407,073 | 4/1995 | Uchida ........................ 206/309 |
| 5,411,134 | 5/1995 | Temple et al.. |
| 5,429,240 | 7/1995 | Biebel et al. ................. 206/309 |
| 5,462,158 | 10/1995 | Kramer ........................ 206/308.1 |
| 5,476,173 | 12/1995 | Opresco ....................... 206/308.1 |
| 5,549,199 | 8/1996 | Lindsay ....................... 206/308.1 |

*Primary Examiner*—Paul T. Sewell
*Assistant Examiner*—Luan K. Bui
*Attorney, Agent, or Firm*—Lockwood, Alex, FitzGibbon & Cummings

[57] ABSTRACT

A compact disc storage case for storing a compact disc includes a base portion with a disc-receiving recess formed therein and a manually manipulated sliding cover that overlies the recess. The cover is bifurcated and has a cover portion and a sliding portion interconnected by a hinge. Movement of the sliding portion raises the cover portion and causes a disc-lifting mechanism to lift the disc partially out of the recess.

25 Claims, 4 Drawing Sheets

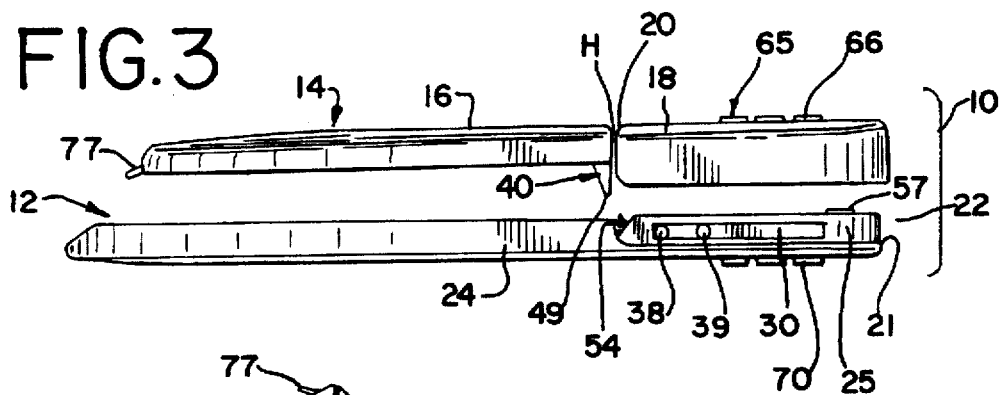
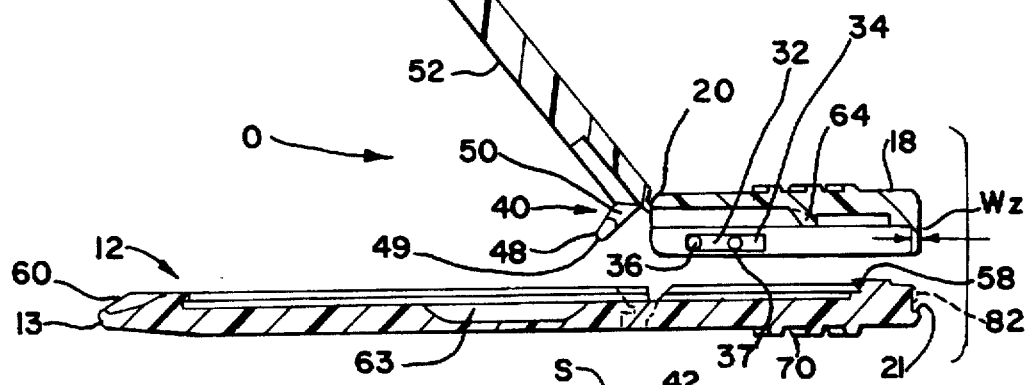
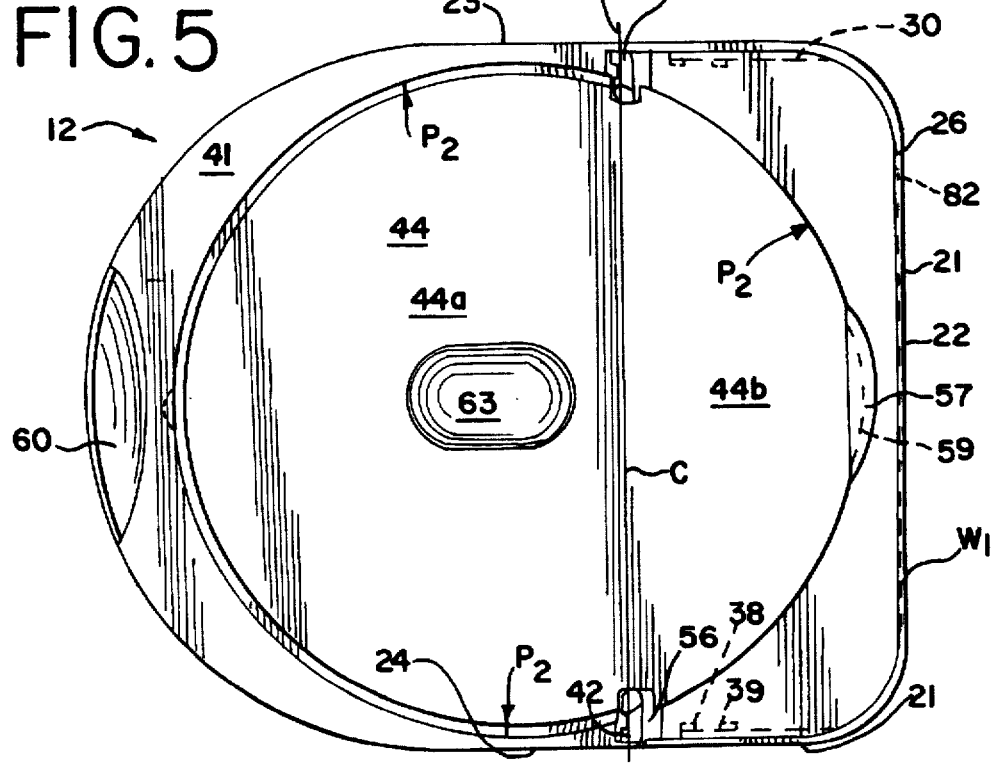

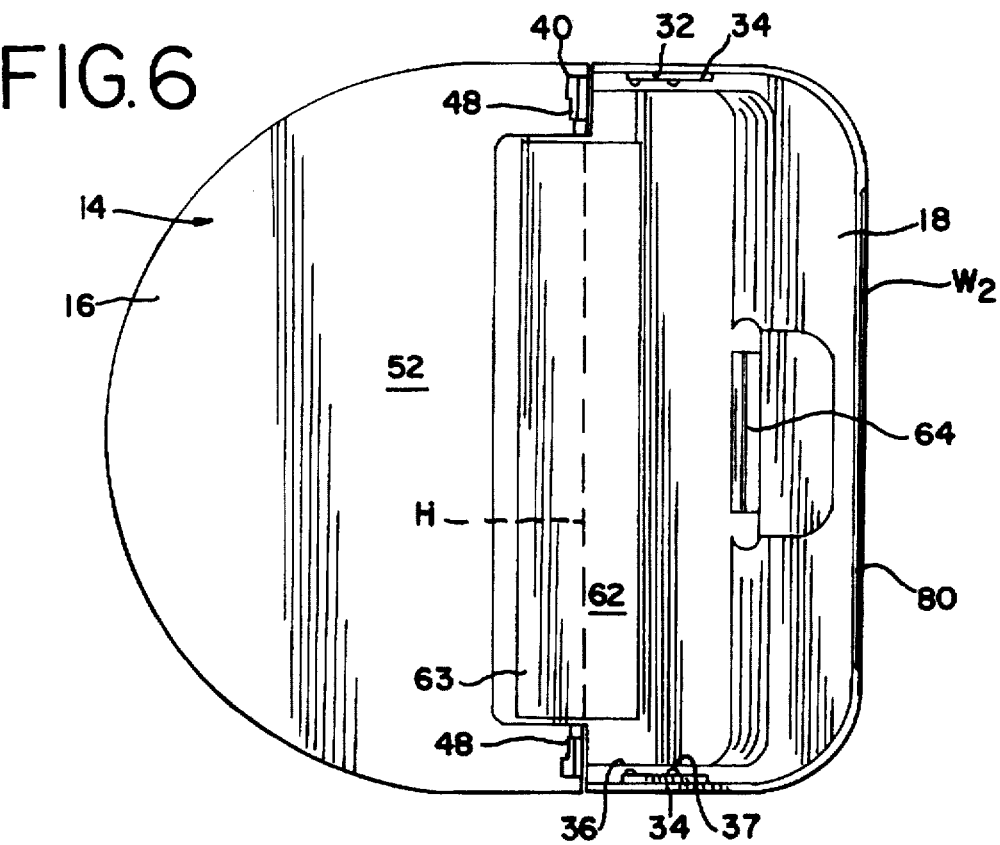
FIG. 6
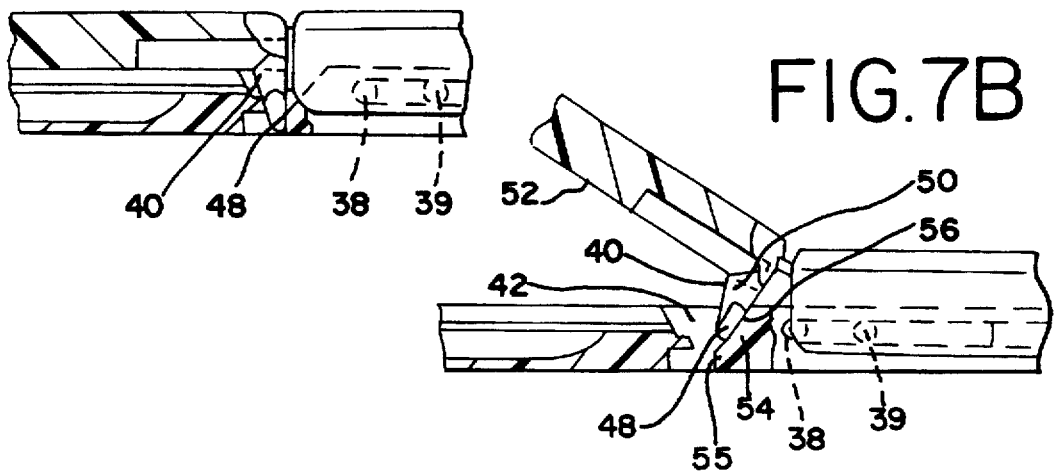
FIG. 7A
FIG. 7B
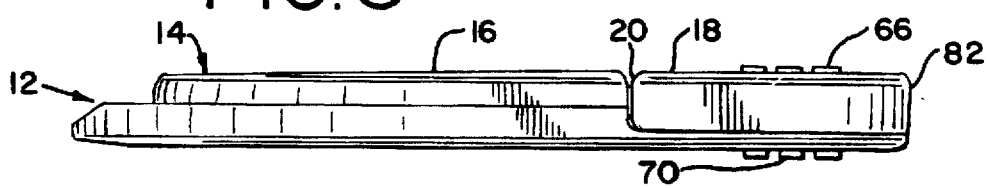
FIG. 8

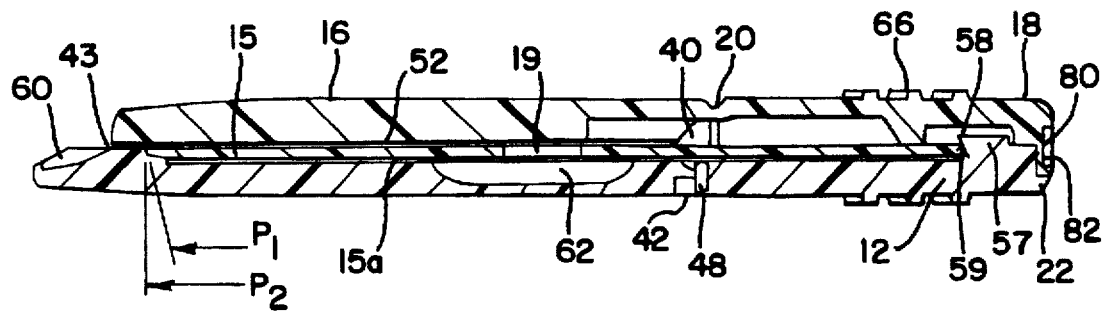
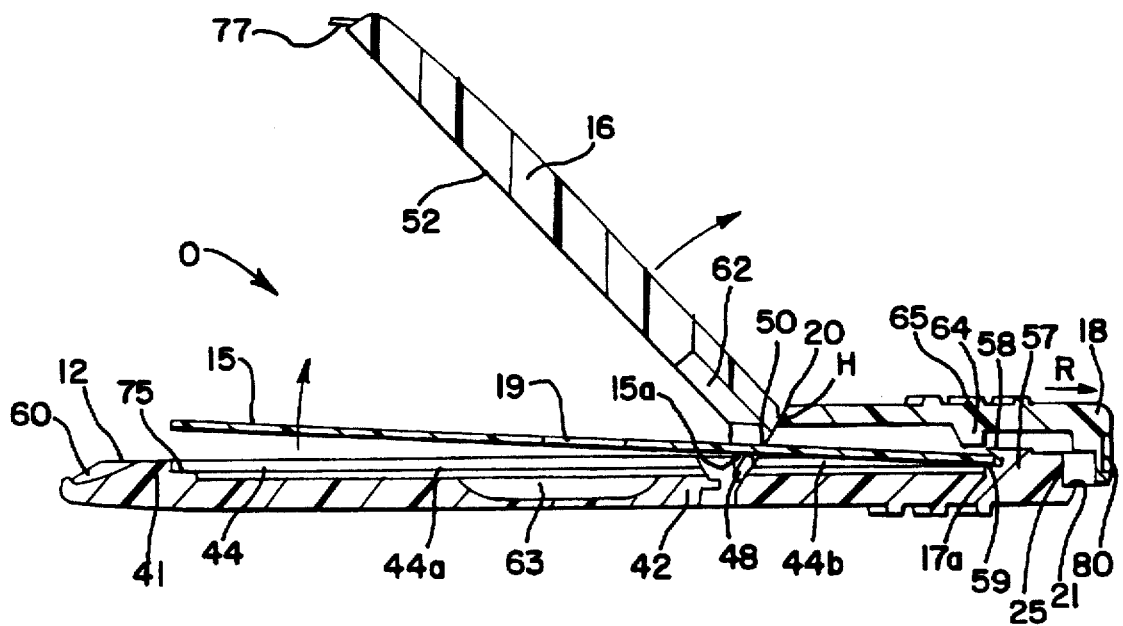

COMPACT DISC STORAGE CASE

BACKGROUND OF THE INVENTION

The present invention relates to a storage containers for compact discs and, more particularly, to a compact disc storage container having a base which receives a compact disc and a shell that covers the base and opens thereon to permit access to the disc when the user moves the shell rearwardly.

Compact discs have become the medium of choice for storing all types of information. Traditionally, compact discs were used for recording and playback of digitally encoded audio material, such as music. Now, with the advent of what is known as "CD-ROMs", compact discs are also used as read-only memory for storage of various data for computers or for computer games and programs. One problem with the use of a compact disc is its storage and transport. In both situations, the compact disc must be protected from any accidental damage.

Storage cases for audio compact discs are commonly known as "jewel boxes", which consist of plastic cover and base portions that are hinged together. The base portion contains a platter with a deflectable hub that engages the disc to hold it in place. Although the manufacturing cost of this type of storage device is minimal, the "jewel box" is fragile and prone to breakage.

Storage cases for the read-only memory type of compact discs, i.e., CD-ROMs, typically utilize a cardboard box or sleeve. The CD-ROMs are taken out of the box every time a user wants to use the data encoded thereon. These cardboard boxes which contain the CD-ROM are subject to constant handling and when the cardboard box is damaged or discarded, the user often leaves the CD-ROM sitting unprotected in a pile.

Many different storage cases for compact discs are known in the prior art. U.S. Pat. No. 5,263,580, issued Nov. 23, 1993, describes a case for compact discs similar to a conventional jewel box that has a hinged cover that slidably engages a groove assembly. Rearward movement of the cover raises and exposes the disc for access. As with the jewel box storage containers, this case is fragile and subject to easy breakage.

U.S. Pat. No. 4,664,261, issued May 12, 1987, describes a storage system which accommodates either compact discs or cassette tapes. This storage device has a box with a hinged lid and a cam that opens the lid as the box is withdrawn from the storage device. These storage boxes are integral to the storage system, and although they provide for adequate protection and access for the compact disc, the individual boxes are not removable from the system and if the system were redesigned to provide for a disengagement of the box, they would be just as fragile and subject to breakage as the jewel box.

Accordingly, a need exists for a compact disc storage container in which the disc is easily accessible by a user and which protects the disc from damage and rough handling.

It is therefore an object of the present invention to provide a storage device for compact discs which overcomes the disadvantages of the prior art and which has a reliable sliding cover to facilitate access to a compact disc.

Another object of the present invention is to provide a durable, lightweight compact disc storage case that is not susceptible to breakage.

Still another object of the present invention is to provide an inexpensive storage case for storing a compact disc, in which the storage case includes a base having a disc-receiving recess defined therein and a bifurcated shell member that engages the base and is slidable thereon, the shell having a cover portion and a slider portion hinged together, the slider portion slidably engaging the base and movable thereon to actuate the cover portion into one of two operative positions wherein in one such position, the disc is held within the disc-receiving recess and covered by the shell cover portion and wherein in the other such position, the disc-receiving recess is opened for access by a user and the shell cover portion is raised away from the base.

It is still another object of the present invention to provide a storage case for a compact disc having a base with a recess that receives a compact disc therein, a shell slidable on the base, the shell having a cover portion and a slider portion, the slider portion slidably engaging tracks formed in the base, and the cover portion including means for moving the cover portion into and out of a covering position, the cover portion moving means further including means for partially raising a compact disc out of said disc-receiving recess to facilitate access thereto by a user.

SUMMARY OF THE INVENTION

The present invention accomplishes these objects and overcomes the disadvantages of the prior art by providing a compact disc storage case having a base with a recess formed therein that receives a compact disc. The base has a bifurcated shell disposed thereon in sliding engagement therewith. In the preferred embodiment, the shell includes a front cover portion that covers most of the disc-receiving recess and a rear slider portion interconnected to the front cover that covers the remainder of the recess and slidably engages the base. The front cover portion includes at least one actuator member, preferably in the form of a cam follower that is adapted to engage an cam surface formed on the base. The actuator and cam surface cooperatively define an actuating mechanism that raises and lowers the front cover portion when the shell rear slider portion is moved back and forth on the base in order to respectively open and close the storage case.

Two actuators may be incorporated in the shell member, preferably in the form of actuating arms that depend downwardly from the front cover portion. These actuator arms are received within opposing slots, or openings, formed in the base. The openings extend within a body portion of the base and also partially extend into the disc-receiving recess. The openings and actuator arms are disposed along a common imaginary line which extends through the base between opposing side edges thereof and further through the disc-receiving recess to define a chord of the recess. The cam surfaces of the base preferably take the form of ramps formed in the base adjacent the openings thereof. The actuator arms ride up and down these ramps in response to movement of the shell upon the base in either rearward or forward directions.

The actuator arms may further include leg portions that project inwardly with respect to the sides of the base and together with an interior surface of the shell, cooperatively define a slot that receives the edges of the compact disc along that are aligned with the recess chord line. These leg portions serve to partially raise the compact disc out from the base disc-receiving recess to facilitate the removal of the compact disc by a user.

These and other objects, features and advantages of the present invention will be clearly understood through a consideration of the following detailed description.

BRIEF DESCRIPTION OF THE DRAWINGS

The invention, may best be understood by reference to the following description taken in conjunction with the accompanying drawings, in the several figures of which like reference numerals identify like elements, and in which:

FIG. 3 is an elevational exploded view of the compact disc storage case of FIG. 1 illustrating the base and shell components thereof;

FIG. 4 is the same view as FIG. 3, but taken in section to illustrate the internal structure of the base and shell components thereof;

FIG. 5 is a top plan view of the base component of the compact disc storage case of FIG. 1;

FIG. 6 is a bottom plan view of the shell component of the compact disc storage case of FIG. 1;

FIG. 7A is an enlarged detail sectional view of the area "A" of FIG. 2 illustrating the base and shell components in a closed position;

FIG. 7B is the same view as FIG. 7A, but illustrating an open position;

FIG. 8 is a side elevational view of the compact disc storage case of FIG. 1 taken along lines 8—8 thereof;

FIG. 9A is a sectional view of the storage case of FIG. 1 taken along lines A—A thereof; and, FIG. 9B is a sectional view of the storage case of FIG. 2 taken along lines B—B thereof.

DESCRIPTION OF THE PREFERRED EMBODIMENT

Figure 1:
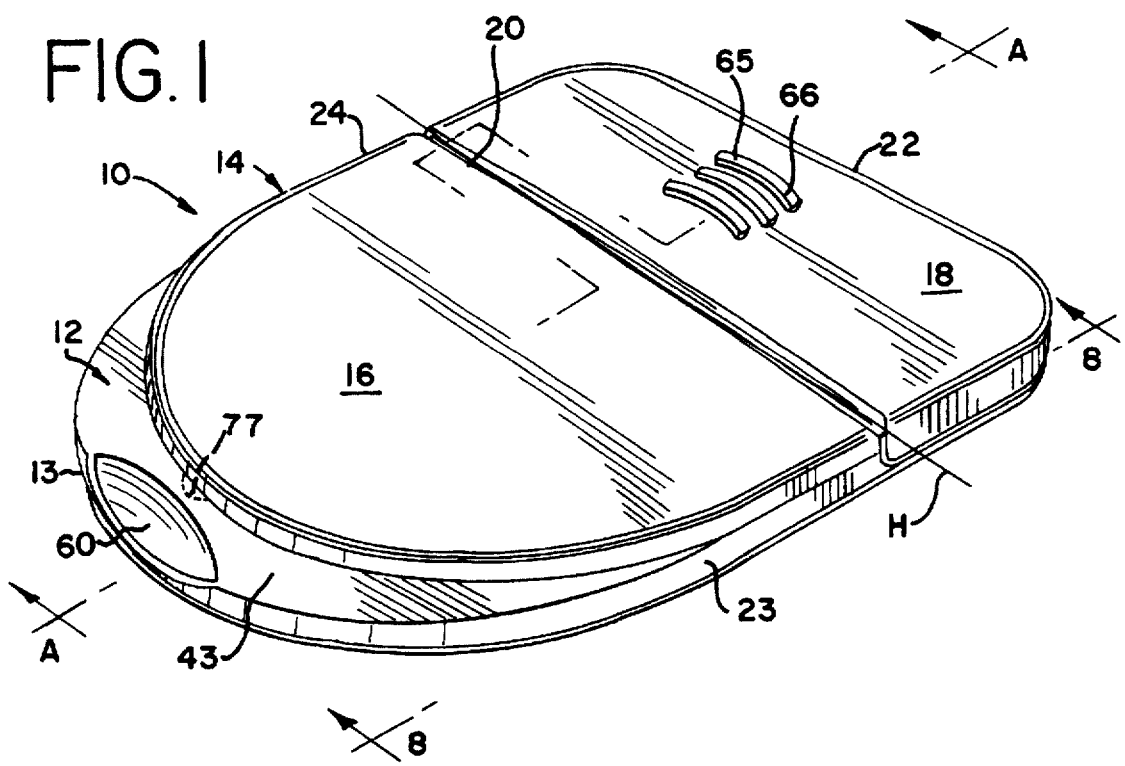
FIG. 1 is a perspective view of a compact disc storage case constructed in accordance with the principles of the present invention.
Figure 2:
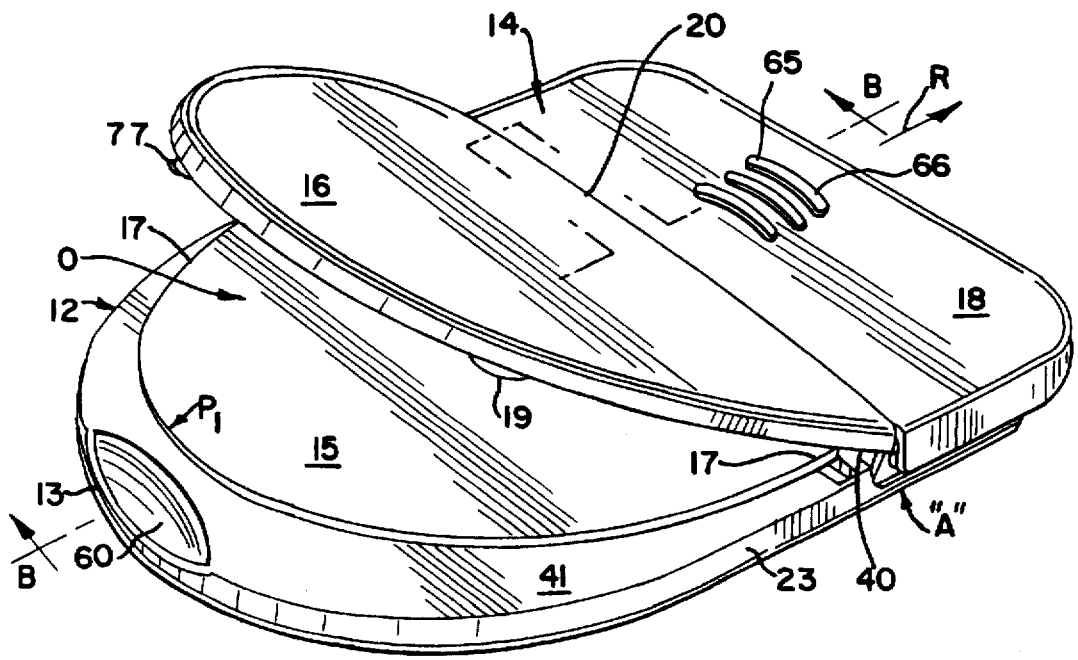
FIG. 2 is the same view as FIG. 1, but illustrating the shell component of the storage case moved rearwardly into an open position for accessing a compact disc held therein.

FIG. 1 illustrates a compact disc storage case 10 constructed in accordance with the principles of the present invention. The case 10 includes two primary components, shown as a base component 12 and a shell component 14. The shell 14 is mounted on the base 12 so that it may be manually manipulated by a user between first and second operative positions, preferably in the slidable engagement manner described below. The first such operative position is illustrated in FIG. 1, wherein the storage case is closed and the shell 14 lies flat upon the base 12. The second such operative position is illustrated in FIG. 2, wherein the storage case is opened and a cover portion 16 of the shell 14 is separated from the base 12 to expose a compact disc 15 held therein to access by a user.

The base 12 preferably is formed as a single piece, such as by molding and from a durable material, such as plastic. The shell 14 is seen to be bifurcated, that is, having two distinct portions, a front cover portion 16 and a rear slider portion 18. The shell 14 may also be integrally molded as a single piece wherein the two cover and slider portions 16, 18 may be interconnected together by a living hinge 20. Alternatively, the shell portions 16, 18 may be separately formed and subsequently interconnected by a suitable means, such as adhesive tape or a hinge assembly, etc. The hinge 20 permits the two bifurcated cover and slider portions 16, 18 to move on the base in different manners with respect to each other as illustrated in FIG. 2, wherein it can be seen that movement of the shell slider portion 18 rearwardly on the base 12 in the direction of arrow R causes the shell front cover portion 16 to open upwardly.

The storage case 10 has a unique "clamshell" style design with the shell component 14 being slightly smaller than the base component 12, and the two forward edges of these two components have different edges that are spaced apart for aesthetic purposes so that a portion of the outer margin 43 of the base body 41 is exposed to view in the closed position. (FIG. 1.) To further enhance the aesthetic nature of the storage case 10, the shell component 14 may be formed from a different color material than the base component 12.

The opening of the shell cover portion 16 is effected by the interaction of the cover portion 16 with a portion of the base 12. In FIGS. 3–5, it can be seen that the base 12 includes a rear rim 21 that extends along the rear edge 22 and side edges 23, 24 thereof. The rim 21, in cooperation with a vertical wall 25 that rises up from the rim 21, in effect defines a recess 26 that preferably has a width $W_1$ that is approximately equal to the width $W_2$ of the sidewalls 28 of the shell rear slider portion 18. When the cover and base are assembled together, these two components preferably lie flush with each other and the shell 14 will not project outwardly with respect to the base 12 to additionally enhance the aesthetic nature of the storage case 10.

The vertical walls 25 of the recess 26 may also include one or more channels, or grooves 30, disposed in the face portions 28 thereof that extend for a portion of the length of the recesses 26 and along the side edges 23, 24 of the base component 12. These grooves 30 receive opposing projections 32, shown in FIG. 6, as a pair of elongated, raised followers 34. These followers 34 may include, as illustrated, one or more detents 36, 37 that extend slightly therefrom which are adapted to engage one of more corresponding opposing depressions 38, 39 formed in the wall grooves 30 in order to provide a positive engagement feature for the sliding interaction of the two base and shell components 12, 14. In such a structure, the front detents 36 will catch the front depressions 38 when the case 10 is closed as in FIG. 1 and they will catch in the rear depressions 39 when the case 10 is opened as in FIG. 2, at the rearmost extent of movement of the shell slides portion 18 upon base component 12.

The storage case 10 may further includes means for actuating the shell cover portion 16 into the open position of FIG. 2 when the shell 14 is slid rearwardly on the base component 12. This actuating means includes a pair of actuators or followers, illustrated as arms 40, that depend down from the shell cover portion 16 in parallel fashion. As shown best in FIG. 6, the actuating arms 40 are disposed forwardly of and preferably adjacent to the hinge line H that separates the cover portion 16 from the rear slider portion 18 of the shell 14.

These actuating arms 40 are received within a pair of corresponding openings 42 disposed in the base component 12. As seen best in FIG. 5, the openings 42 are arranged in a parallel fashion and preferably intersect with the perimeter $P_2$ of the disc-receiving recess 44 of the base 12. This perimeter $P_2$ is approximately equal and preferably slightly larger than the perimeter $P_1$ of the compact disc 15 so that the compact disc 15 will be within the disc-receiving recess 44 without sliding around. The disc-receiving recess 44 is formed in a body portion 41 of the base component 12 and is surrounded by an outer margin 43 of the body portion 41. The disc-receiving recess 44 is preferably slightly larger than the compact disc 15 so that the disc 15 is completely held therein.

The actuating arms 40 are spaced apart from each other and preferably are aligned with each other along a common imaginary line S that is drawn through the base 12 between the opposing sides 23, 24 thereof. This line S extends through the base and through the disc-receiving recess 44. In passing through the circular disc-receiving recess 44 illustrated, the line S defines a chord C of the recess 44 that may be considered as dividing the disc-receiving recess 44 into two distinct portions 44a, 44b. When the storage case 10 is closed, the shell front cover portion 16 covers substantially all of the recess first portion 44a and the shell rear slider portion 18 covers substantially all of the recess second portion 44b.

The actuating arms 40 may further each include a disc-engaging foot 48 at the end 49 thereof that extends outwardly from the arms 40, but inwardly relative to the disc-receiving recess 44. These feet 48 further are preferably located on the actuator arms along the chord line C, i.e., they fall within the perimeter P₂ of the compact disc 15. The feet 48 cooperate with the interior surface 52 of the shell cover portion 16 to define a slot 50 therebetween the feet 48. As explained in greater detail to follow, this slot 50 receives the outer edges 17 of the compact disc 15 along the chord C and the feet 49 of the actuator arms 40 partially raise the compact disc 15 out from the base disc-receiving recess 44 to facilitate the removal of the compact disc 15 by a user.

As mentioned above, the openings 42 of the base 12 receive the actuator arms 40 therein and they further include one or more stationary cam surfaces, shown as ramps 54, that extend upwardly and rearwardly within the openings 42. In the embodiment illustrated, these ramps serve to terminate the vertical wall 25 of the base rim 21 and the actuating arms 40 ride upon then during opening and closing of the storage case 10. In a closed position, such as that illustrated in FIG. 1, the actuator arms 40 rest against the base portions 55 of the ramps 54 and the shell cover portion 16 lies flat upon the base 12. (FIG. 7A.) However, when the shell slider portion 18 is moved rearwardly as illustrated in FIG. 2, the actuating arms 40 are moved off of the ramp base portions 55 onto the inclined portions 56 thereof and upwardly and rearwardly. This movement causes the shell front cover portion 16 to rise at an angle θ with respect to the base 12. In this position, the shell front cover portion 16 is raised to and creates an opening "O" that permits a user to insert his or her hand between the shell cover 16 and the base 12 to grasp the compact disc 15.

The disc-receiving recess 44 may include a raised catch 57 formed in the base 12 and partially extending over a small portion of the recess 44. This catch 57 extends slightly over the recess 44 and, in essence, forms a lip 58 that extends slightly over the rear edge 59 of the disc-receiving recess 44. The catch 57 and its lip 58 act as a backstop against which the compact disc 15 abuts against when a user inserts it into the recess 44. This backstop also holds the rear edge 17a of the compact disc 15 in place so that the compact disc 15 will pivot upwardly at the catch 57 when the case 10 is opened.

In order to facilitate the handling of the storage case 10, the base 12 may include an arcuate recess formed along its front edge 13 that serves as a grip 60 for a user's fingers in handling the storage case 10. Additionally, the disc-receiving recess 44 may include in the center thereof an elongated depression 62 which is aligned with the center hole 19 of the compact disc 15 to provide a reaction surface for the user to engage with his or her finger to extract the compact disc 15 via the center hole 19, rather than grab the compact disc 15 by its underside in a manner that may deposit oil or the like which might obscure some of the information encoded thereon. The disc-receiving recess 44 may include along its forward edge, a lip 75 formed in opposition to a protruding tab 77 of the top shell 14. The tab 77 and lip 75 cooperate to hold the shell cover portion 16 in engagement with the base 12 in place over the disc-receiving recess 44.

As best seen in FIG. 6, the interior surface 52 of the shell 14 may include a cavity 62 that extends through portions of the cover portion 16 and slider portion 18. This cavity 62 may receive a mechanical hinge assembly or, as previously mentioned, it may receive the adhesive tape hinge 63. Positioned within the cavity 62 is a top catch 64 that is preferably aligned with the base catch 57 and its raised lip 58. The depth of the top catch 64 is slightly greater than the height of the base raised catch 57 so that the two will abut each other during rearward movement of the shell slider portion 18 on the base 12. Hence, these two catches cooperate to limit the rearward movement of the shell 14 into its second and open operative position.

In order to facilitate the user's operation of the storage case, the top of the shell 14, specifically as shown in FIG. 8, may include one or more raised projections 65 that serve as thumb grips 66. The bottom surface of the base 12 may also include similar projections 70 disposed thereon to further improve the user's grip on the storage case 10. In operation, the user will typically place his or her thumb on the top thumb grips 66 of the shell rear slider portion 18 and one or more remaining fingers against the bottom projections 70. The user then draws the shell rear slider portion 18 rearwardly. Movement of the rear slider portion 18 rearwardly draws the actuating arms 40 into contact with the ramps 54 of the base component 12 and follow their inclination, drawing them partially out of the base openings 42 and up the inclined portions 56 of the ramps 54 as shown in FIG. 7B. Inasmuch as the actuating arms 40 are disposed forwardly of the hinge H, the upward movement of the actuating arms 40 along the ramp surfaces 55, 56 causes the shell front cover portion 16 to pivot up about the hinge H.

During this upward movement, the actuating arm disc-engaging feet 48 contact the underside 15a of the compact disc 15 at the outer edges 17 thereof, while the rear edge 17a of the compact disc 15 lies underneath the lip 58 of the base catch 57. The actuating arm disc-engaging feet 48 therefore raise the compact disc 15 upwardly at an angle from the bottom of the disc-receiving recess 44 so that the disc 15 pivots as described above. The actuator arms 40 not only follow the ramped cam surfaces 54, but also uniquely act as levers that raise the compact disc 5.

Although the invention has been shown and described in terms of the illustrated clam-style preferred embodiment, it will be understood that changes and modifications may be made therein without departing from the invention in its broader aspects such as replacing the stationary ramps 54 with stationary posts for example, or utilizing only one cam surface and follower arrangement to the shell front cover portion 16 up from the base component 12.

Additionally, the exterior aspects of the storage case 10 may be modified without affecting the utility of the invention. For example, the rear face 78 of the shell slider portion 14 may be equipped with a recess 80 that is dimensioned to receive a label 82 for the purpose of identifying the data or music contained on the compact disc 15 held in the storage case 10. Alternatively, the shell slider portion 18 may be formed from a translucent material so that the label may be applied to the rear edge 22 of the base member 12, the label being readable through the translucent shell slider portion 18.

While the preferred embodiment of the invention have been shown and described, it will be apparent to those skilled in the art that changes and modifications may be made therein without departing from the spirit of the invention, the scope of which is defined by the appended claims.

We claim:

1. A holder for a compact disc, comprising:
   a base member having a body portion, the body portion including a disc-receiving recess formed with the base member body portion, the disc-receiving recess being at least partially defined by an outer margin of said base member body portion, said disc-receiving recess being further sized to receive a compact disc therein;
   a bifurcated shell member disposed on said base member and covering said disc-receiving recess, the bifurcated shell member including a slider portion slidably engaging said base member and a cover portion interconnected to the slider portion, the cover portion being moveable between open and closed positions, wherein in said closed position, said cover portion overlies said disc-receiving recess and upon said base member body portion outer margin, and wherein in said open position, said shell cover portion is spaced apart from said base member body portion and defines an opening to said disc-receiving recess by which a user may gain access to a compact disc disposed within said disc-receiving recess; and,
   means for actuating said cover portion between said open and closed positions, the actuating means including a cam surface disposed on said base member and a follower disposed on said shell member, said base member including an opening disposed therein proximate to the base member cam surface, said base member opening further being disposed in opposition to said shell member follower such that said shell member follower extends into said base member opening when said cover portion is in said closed position and said shell member follower is at least partially withdrawn from said base member opening when said cover portion is in said open position, said cover portion being moveable in response to movement of said cover portion follower upon said base member cam surface.

2. The compact disc holder as defined in claim 1, wherein said base member opening is defined by a plurality of walls and said base member cam surface forms one of said base member opening walls.

3. The compact disc holder as defined in claim 1, wherein said shell member follower includes a disc-engaging foot spaced apart from said cover portion so as to define a slot therebetween, the slot receiving an outer edge of a compact disc placed in said disc-receiving recess, the disc-engaging foot partially lifting said compact disc out of said disc-receiving recess when said cover portion is in said open position.

4. The compact disc holder as defined in claim 1, wherein said disc-receiving recess has a generally circular configuration and said base member opening partially extends into said disc-receiving recess.

5. The compact disc holder as defined in claim 1, wherein said base member includes an additional opening and an additional cam surface and said cover portion includes an additional follower disposed thereon is opposition to said base member additional opening.

6. The compact disc holder as defined in claim 5, wherein said base member opening and additional opening are designed with each other along a common imaginary line that defines a chord line in said disc-receiving recess.

7. The compact disc holder as defined in claim 6, wherein said chord line is rearward of a center of said disc-receiving recess.

8. The compact disc holder as defined in claim 1, further including a lower catch disposed on said base member and rising upwardly therefrom and an upper catch disposed on said shell member and depending downwardly therefrom, said lower and upper catches being aligned together along a longitudinal axis of said holder, whereby said upper catch engages said lower catch during movement of said shell member on said base member to limit the movement of said shell member relative to said base member.

9. The compact disc holder as defined in claim 1, wherein said base member includes grooves formed therein and said slider portion includes projections received within said grooves, said grooves providing a guide track for movement of said shell member upon said base member.

10. The compact disc holder as defined in claim 1, wherein said shell member cover portion has a rim that overlies a portion of said base member body portion outer margin when said cover portion is in said closed position.

11. The compact disc holder as defined in claim 5, wherein said each of said cover portion follower and additional follower includes a disc-engaging foot, said disc-engaging feet contacting said compact disc when said cover portion followers are partially withdrawn from said base member openings when said cover portion is in said open position, and said base member includes a stop that engages a rear edge of said compact disc placed in said disc-receiving recess, said stop defining a fulcrum about which said compact disc pivots when said cover portion is in said open position and said disc-engaging feet engage said compact disc.

12. The compact disc holder as defined in claim 5, wherein said cover portion and slider portion are interconnected by a hinge.

13. The compact disc holder as defined in claim 12, wherein said actuating means is disposed proximate to and forwardly of said hinge.

14. The compact disc holder as defined in claim 1, wherein said cover portion includes a tab that engages a portion of said disc-receiving recess to retain said cover portion in place on said base member when said cover portion is in said closed position.

15. The compact disc holder as defined in claim 1, wherein part of said cover portion is translucent and permits a user to view a portion of said base therethrough.

16. A storage case for a compact disc that is manually manipulated between an open position wherein the compact disc may be inserted into or removed from the storage case and a closed position wherein said compact disc is held within said storage case, comprising: a case having a body with a recess disposed therein that receives said compact disc, guide tracks disposed on opposite sides of said case, a movable lid disposed on said case and overlying said disc-receiving recess, the lid having front and rear portions interconnected by a hinge, one of said lid front and rear portions including runners disposed in opposition to said case guide tracks, said runners slidably engaging said case guide tracks and permitting back and forth movement of said lid upon said case, one of said back and forth movements raising said lid away from said disc-receiving recess to define an opening therebetween by which a user may gain access to said compact disc, and the other of said back and forth movements closing said opening by lowering said lid onto said case over said disc-receiving recess, said lid including means for partially lifting said compact disc out of said disc-receiving recess when said lid is raised.

17. The compact disc holder as defined in claim 16, wherein said disc lifting means includes disc-engaging arms extending from said lid along edges of said compact disc and contacting said compact disc in said disc-receiving recess, whereby raising said lid partially raises said compact disc out of said disc-receiving recess.

18. The compact disc holder as defined in claim 17, wherein said disc lifting means further includes a stop disposed on said case, the stop holding a preselected edge of said compact disc stationary during opening of said lid, said stop being disposed rearwardly of and spaced apart from said disc-engaging arms, said disc-engaging arms causing said compact disc to pivot upwardly about said compact disc preselected edge at said stop.

19. The compact disc holder as defined in claim 17, wherein said disc-engaging arms include cam followers and said case includes cam surfaces in opposition to said cam followers, whereby said movement of said lid upon said case in one direction causes said lid to move away from said case.

20. The compact disc holder as defined in claim 19, wherein said cam surfaces are recessed within said case body and said cam followers depend into said case body proximate to said cam surfaces.

21. The compact disc holder as defined in claim 19, wherein said cam surfaces are aligned together along a chord of said disc-receiving recess.

22. The compact disc holder as defined in claim 19, wherein said disc-engaging arms are disposed on said lid forwardly of said hinge.

23. The compact disc holder as defined in claim 16, wherein said case body includes a rim and said lid includes at least one sidewall slidable on said rim and said rim and sidewall have approximately equal thicknesses.

24. The compact disc holder as defined in claim 16, wherein said movable lid includes means for engaging said body to retain said movable lid in position overlying said recess.

25. The compact disc holder as defined in claim 16, wherein at least one of said movable lid and body includes projections disposed thereon, said projections facilitating a user's grip on said case for opening said case.

* * * * *